(12) United States Patent
Martire

(10) Patent No.: US 12,195,339 B2
(45) Date of Patent: Jan. 14, 2025

(54) PERTURBED SYMMETRY IN STACKED GRAPHENE TECHNOLOGIES

(71) Applicant: Applied Physics, Inc., New York, NY (US)

(72) Inventor: Gianni Martire, New York, NY (US)

(73) Assignee: Applied Physics, Inc., New York, NY (US)

( * ) Notice: Subject to any disclaimer, the term of this patent is extended or adjusted under 35 U.S.C. 154(b) by 0 days.

(21) Appl. No.: 18/587,545

(22) Filed: Feb. 26, 2024

(65) Prior Publication Data

US 2024/0199428 A1 Jun. 20, 2024

Related U.S. Application Data

(63) Continuation of application No. PCT/US2022/041160, filed on Aug. 23, 2022.

(60) Provisional application No. 63/236,669, filed on Aug. 24, 2021.

(51) Int. Cl.
  *C01B 32/184* (2017.01)
  *B32B 18/00* (2006.01)

(52) U.S. Cl.
  CPC ............ *C01B 32/184* (2017.08); *B32B 18/00* (2013.01); *C01B 2204/04* (2013.01); *C01B 2204/22* (2013.01); *C01B 2204/24* (2013.01); *C01P 2002/77* (2013.01)

(58) Field of Classification Search
  CPC .............. C01B 32/184; C01B 2204/04; C01B 2204/22; C01B 2204/24; C01B 32/182; B32B 18/00; C01P 2002/77; B82Y 30/00
  See application file for complete search history.

(56) References Cited

U.S. PATENT DOCUMENTS

2014/0050920 A1 2/2014 Ray et al.
2020/0189240 A1 6/2020 Dimitrakopoulos et al.

OTHER PUBLICATIONS

Wogan, Tim, "Twisted trilayer graphene supports existence of exotic superconductivity", Feb. 11, 2021, obtained from https://www.chemistryworld.com/news/twisted-trilayer-graphene-supports-existence-of-exotic-superconductivity/4013216.article (Year: 2021).*

(Continued)

*Primary Examiner* — Brian Handville
(74) *Attorney, Agent, or Firm* — Cognition IP, P.C.; Edward Steakley; Justin White

(57) ABSTRACT

A graphene structure can include multiple graphene layers stacked into a perturbed symmetry. A first graphene layer can be situated a first rotational angle with respect to a rotational axis extending perpendicularly through the first graphene layer, and a second graphene layer can be situated atop the first graphene layer at a second rotational angle with respect to the rotational axis. A third graphene layer can be situated atop the second graphene layer at a third rotational angle with respect to the rotational axis, and the third rotational angle can be different than the second rotational angle. Additional graphene layers can be successively stacked onto the graphene structure, with each layer being set at a different rotational angle than the previous layer. Six total graphene layers can be stacked. The relationship of the ratios between all rotational angles can forms an arithmetic, geometric, or Fibonacci sequence, or another pattern.

4 Claims, 8 Drawing Sheets

(56) References Cited

OTHER PUBLICATIONS

International Search Report and Written Opinion of the International Search Authority in International Application No. PCT/US2022/041160, mailed on Jan. 23, 2023.
Mogera U., & Kulkarni, G. U. (2020). A new twist in graphene research: Twisted graphene. Carbon, 156, 470-487.
Lopez-Bezanilla, A., & Lado, J. L. (2020). Electrical band flattening, valley flux, and superconductivity in twisted trilayer graphene. Physical Review Research, 2(3), 033357.
Chen, X. D., Xin, W., Jiang, W. S., Liu, Z. B., Chen, Y., & Tian, J. G. (2016). High-Precision Twist-Controlled Bilayer and Trilayer Graphene. Advanced Materials, 28(13), 2563-2570.
Kim, K., Yankowitz, M., Fallahazad, B., Kang, S., Movva, H. C., Huang, S., . . . & Tutuc, E. (2016). van der Waals heterostructures with high accuracy rotational alignment. Nano letters, 16(3), 1989-1995.
Kim, K., Yankowitz, M., Fallahazad, B., Kang, S., Movva, H. C., Huang, S., . . . & Tutuc, E. (2016). Supporting Information van der Waals heterostructures with high accuracy rotational alignment. Nano letters, 16(3), 1989-1995.
Cao, C., Wu, T., & Sun, Y. (2021). A review of assembly techniques for fabricating twisted bilayer graphene. Journal of Micromechanics and Microengineering, 31(11), 114004.
Cao, Yuan, et al. "Unconventional superconductivity in magic-angle graphene superlattices." Nature 556.7699 (2018): 43-50.

\* cited by examiner

PERTURBED SYMMETRY IN STACKED GRAPHENE TECHNOLOGIES

CROSS-REFERENCE TO RELATED APPLICATIONS

This application is a continuation of international application no. PCT/US2022/041160, filed on Aug. 23, 2022, which claims the benefit of priority to provisional application No. 63/236,669, filed on Aug. 24, 2021, which are hereby incorporated by reference in their entirety.

TECHNICAL FIELD

The present disclosure relates generally to graphene technologies, and more particularly to improved properties in structured graphene arrangements.

BACKGROUND

Graphene has been highlighted as a wonder material, and it is predicted to play a major role in future technologies as diverse as biosensors, radiation detectors and next-generation quantum technologies such as qubits. Current research is directed at controlling the electronic properties of graphene devices through stacking and twisting individual graphene flakes. In these devices, the interaction of electrons is controlled by the interference pattern that forms when stacking the graphene flakes. For example, electrons can form a superconducting phase at a stacked angle of 1.1 degrees.

Although this is a remarkable finding, not much work has been directed at finding even better graphene structures, and there remains little understanding regarding how control of these interference patterns can lead to tunable electronic properties. Unfortunately, the superconducting properties of 1.1 degrees stacked angle graphene layers are still limited and do not result in any currently viable cost-effective applications.

Although traditional ways of forming graphene structures have worked well in the past, improvements are always helpful. In particular, what is desired are graphene structures having improved properties beyond those of previously constructed structures.

SUMMARY

It is an advantage of the present disclosure to provide graphene structures having improved properties beyond those of previously constructed structures. The disclosed features, apparatuses, systems, and methods relate to stacked graphene technologies having perturbed symmetries and methods of forming same. The disclosed apparatuses, systems, and methods take advantage of known properties of simple graphene structures and provide more complex graphene structures having greatly enhanced properties.

In various embodiments of the present disclosure, an apparatus, which can be a graphene structure, for example, can include at least first, second, and third graphene layers. The first graphene layer can be situated at a first rotational angle with respect to a rotational axis extending perpendicularly through the first graphene layer. The second graphene layer can be situated atop the first graphene layer at a second rotational angle with respect to the rotational axis. The third graphene layer can be situated atop the second graphene layer at a third rotational angle with respect to the rotational axis, and the third rotational angle can be different than the second rotational angle.

In various detailed embodiments, the apparatus can further include fourth, fifth, and sixth graphene layers. The fourth graphene layer can be situated atop the third graphene layer at a fourth rotational angle with respect to the rotational axis, and the fourth rotational angle can be different than the third rotational angle. The fifth graphene layer can be situated atop the fourth graphene layer at a fifth rotational angle with respect to the rotational axis, and the fifth rotational angle can be different than the fourth rotational angle. The sixth graphene layer can be situated atop the fifth graphene layer at a sixth rotational angle with respect to the rotational axis, and the sixth rotational angle can be different than the fifth rotational angle. In various arrangements, each rotational angle from the second rotational angle through the sixth rotational angle can be greater than the previous rotational angle. In addition, the relationship of the ratios from the first rotational angle through the sixth rotational angle can form an arithmetic, geometric, or Fibonacci sequence. In various arrangements, the apparatus can exhibit superconductivity, increased thermal conductivity, tensile strength, and/or photosensitivity, as well as other improved properties at high temperatures. One or more additional graphene layers can also be stacked onto the apparatus. Each additional graphene layer can be situated atop the previous graphene layer at an additional rotational angle with respect to the rotational axis, and each additional rotational angle can be different than the previous rotational angle. In some arrangements, each additional rotational angle can be greater than the previous rotational angle, and the relationship of the ratios of all rotational angles can also form an arithmetic, geometric, or Fibonacci sequence.

In various further embodiments of the present disclosure, methods of forming a graphene structure are provided. Pertinent process steps can include forming with formation equipment a first graphene layer, rotating the formation equipment a first rotational amount, forming a second graphene layer atop the first graphene layer, rotating the formation equipment a second rotational amount, and forming a third graphene layer atop the second graphene layer. The first graphene layer can be formed at a first rotational angle with respect to a rotational axis extending perpendicularly through the first graphene layer. The second graphene layer can be formed at a second rotational angle that equals the first rotational angle plus the first rotational amount. The second rotational amount can be different than the first rotational amount. The third graphene layer can be formed at a third rotational angle that equals the second rotational angle plus the second rotational amount.

In various detailed embodiments, additional steps can include rotating the formation equipment a third rotational amount, forming a fourth graphene layer atop the third graphene layer, rotating the formation equipment a fourth rotational amount, forming a fifth graphene layer atop the fourth graphene layer, rotating the formation equipment a fifth rotational amount, and forming a sixth graphene layer atop the fifth graphene layer. Each rotational amount can be different than the previous rotational amount, and each graphene layer can be formed at a rotational angle that equals the previous rotational angle plus the newest rotational amount. Each rotational angle from the second rotational angle through the sixth rotational angle can be greater than the previous rotational angle.

Further process steps can include rotating the formation equipment one or more additional rotational amounts, each of which is different than the previous rotational amount and forming one or more additional graphene layers after each formation equipment rotation. Each additional graphene layer can be situated atop the previous graphene layer at an additional rotational angle with respect to the rotational axis, and each additional rotational angle can equal the previous rotational angle plus the newest rotational amount. In some arrangements, the relationship of the ratios from all rotational angles can form an arithmetic, geometric, or Fibonacci sequence, or some other pattern. Each of the various possible graphene structures can exhibit superconductivity, increased thermal conductivity, tensile strength, and/or photosensitivity, as well as other improved properties at relatively high temperatures.

In various further detailed embodiments, further process steps can include preparing a precursor graphene structure, pushing a coated substrate onto the precursor graphene, and heating the substrate to tear graphene flakes from the coated substrate. The precursor graphene structure can be bilayer graphene with a single layer of hexagonal boron nitride, and the coated substrate can be polydimethylsiloxane coated glass.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods for forming the disclosed stacked graphene technologies having perturbed symmetries. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for forming graphene arrangements and structures having enhanced properties. The disclosed embodiments involve forming and using graphene arrangements having stacked graphene layers that are situated at rotational angles with respect to each other. In various embodiments, more than two stacked graphene layers are formed. In some structures, six or more stacked graphene layers can be formed. The stacked graphene layers can be rotated with respect to each other by different rotational degrees into a perturbed symmetry to enhance the properties of the overall stacked graphene structure. In some arrangements, the relative rotational ratios between the stacked layers can follow an arithmetic, geometric, or Fibonacci sequence, or some other pattern.

Although various embodiments disclosed herein discuss stacked graphene layers rotated at different angles with respect to each other into a perturbed symmetry, it will be readily appreciated that the disclosed features, apparatuses, systems, and methods can similarly be with any suitable substitute or alternative materials that take advantage of the disclosed features. Similarly, any other form of varied rotational patterns may be used beyond arithmetic, geometric, or Fibonacci sequences. Of course, other amounts of stacked layers greater or less than six layers may be used, as well as other suitable ways of forming these stacked layers. Other applications, arrangements, and extrapolations beyond the illustrated embodiments are also contemplated.

Figure 1:
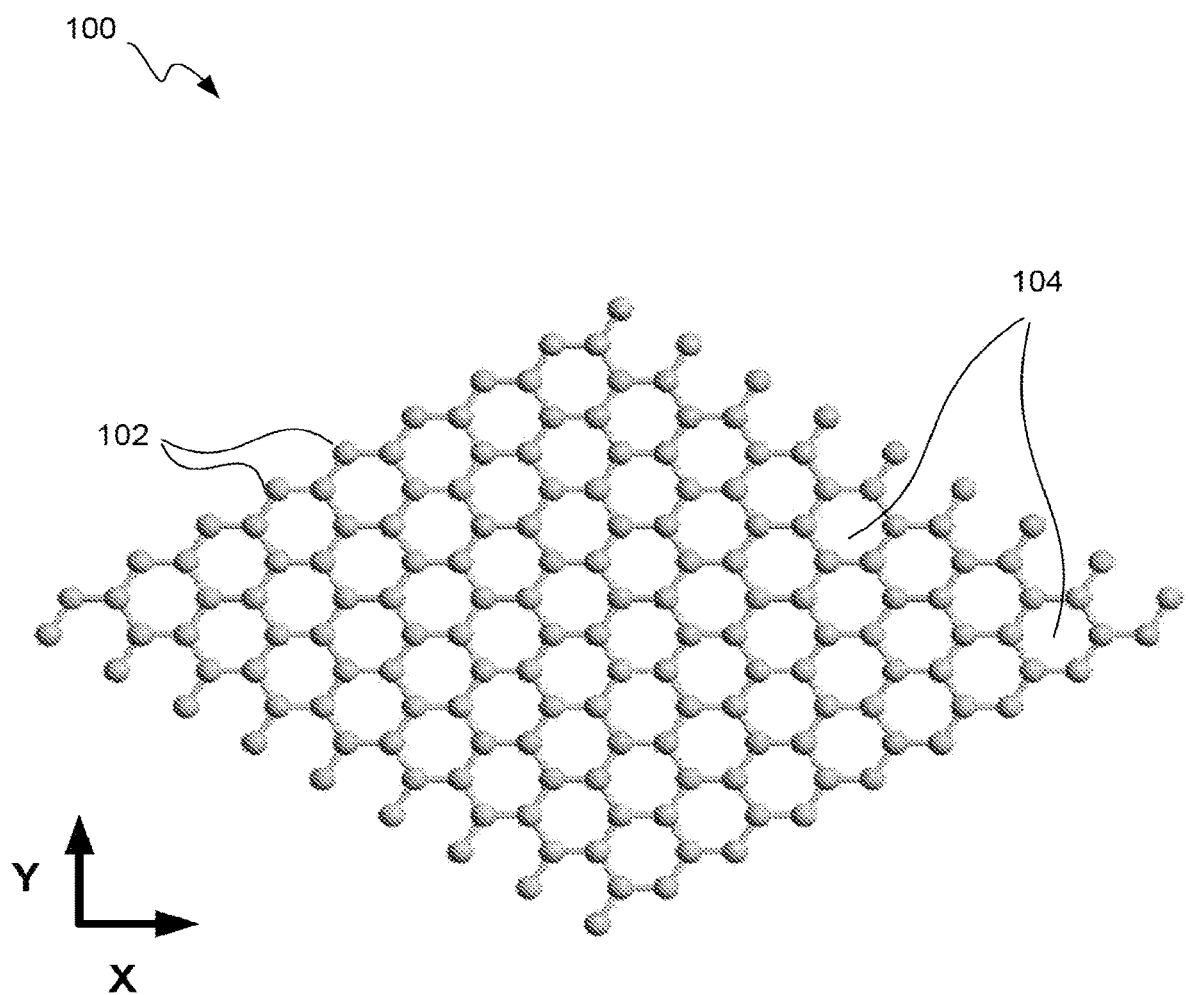
FIG. 1 illustrates in top plan view an example graphene layer.

Referring first to FIG. 1, an example graphene layer is shown in top plan view. As is generally well known, graphene is an excellent two-dimensional material with all carbon atoms. Graphene layer 100 can include a single layer of carbon atoms 102 arranged in a pattern of repeating hexagons 104 into a flat two-dimensional honeycomb lattice. Graphene layer 100 can extend laterally as far as desired in both X and Y dimensions but is limited to a thickness of a single atom in the Z direction. Each carbon atom 102 can be coupled to its three nearest neighbors by a covalent bond and can contribute one electron to a conduction band that extends across the entire graphene layer 100. The sixfold symmetry of the atomic lattice, coupled with the low nuclear mass of carbon atoms, ensures that electrons are weakly bound and behave as almost massless particles, allowing them to conduct at near relativistic speeds. The combined effects yield a low dimensional quantum matter system where properties are directly related to geometric configuration or arrangement. Other features and properties of graphene layer 100 are generally well understood to those of skill in the art.

Figure 2A:
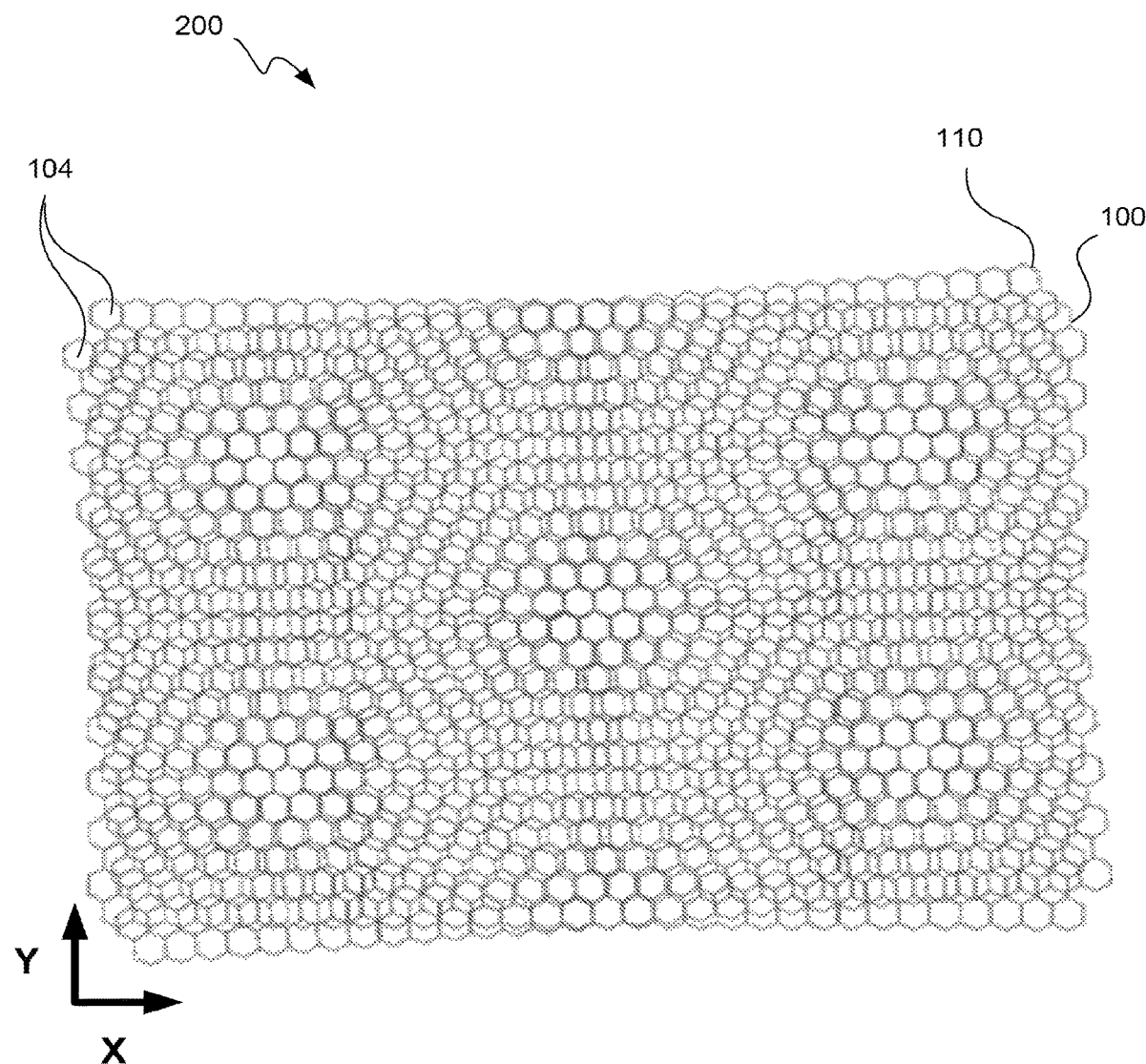
FIG. 2A illustrates in top plan view an example structure having two stacked and rotated graphene layers according to one embodiment of the present disclosure.
Figure 2B:
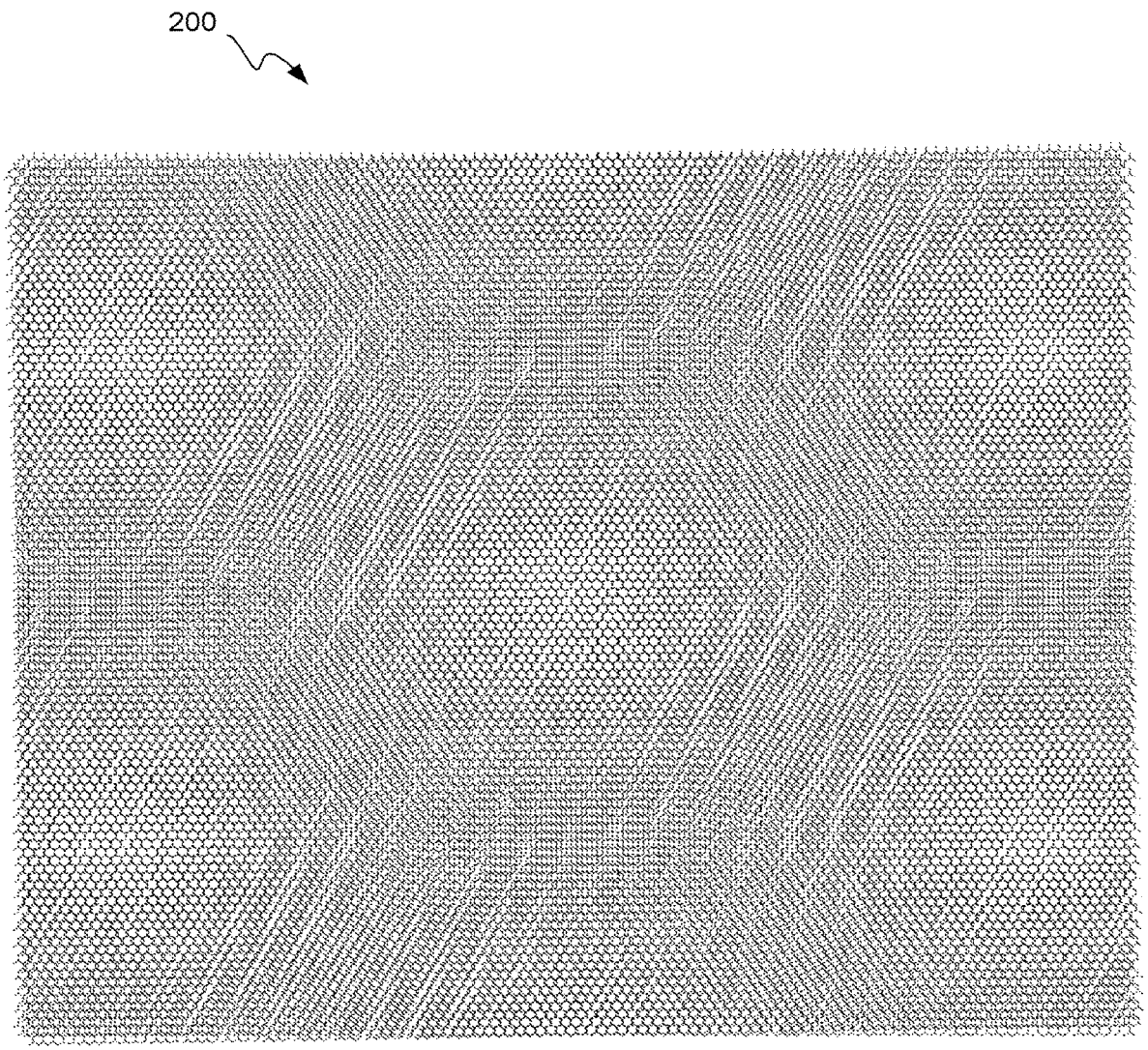
FIG. 2B illustrates in top plan view the structure of FIG. 2A on a larger scale according to one embodiment of the present disclosure.

Moving next to FIGS. 2A and 2B an example structure having two stacked and rotated graphene layers is also illustrated in top plan view. Graphene structure 200 can include first graphene layer 100 and second graphene layer 110, both of which can include the same pattern of carbon atoms arranged into a pattern of repeating hexagons 104. First graphene layer 100 can be situated at a first rotational angle with respect to a rotational axis extending perpendicularly therethrough (i.e., along the Z axis into the page). Such a first rotational angle can be a reference angle of zero for purposes of discussion. Second graphene layer 110 can be situated atop the first graphene layer 100 such that the layers are stacked and can be situated at a second rotational angle with respect to the rotational axis. This second rotational angle can be small or nominal but is non-zero. For example, if the first rotational angle is zero, then the second rotational angle can be one degree. Of course, other rotational amounts are also possible.

With just two graphene layers 100, 110 stacked and rotated with respect to each other, at least some Moire interference patterns can be observed in the overlapping hexagons 104 throughout structure 200. These long range interference patterns can influence electronic interactions between graphene layers 100 and 110 and can also lead to a superconducting phase at desirable temperatures under the right circumstances. Other improved properties may include unique semiconductivity and/or magnetic properties, increased thermal conductivity, tensile strength, and/or photosensitivity as well. Although many studies have focused on single layers of graphene, it is noted that stacked layers of graphene can result in various interesting phenomena. This can be a result of interlayer interactions that affect the movement of electrons in the respective layers. For example, bilayer graphene flakes twisted (i.e., rotated) at a relative angle can undergo a superconducting transition and can also exhibit magnetism and other highly correlated phase transitions. Accordingly, controlling the rotational angle between graphene layers can be used to tune electronic properties of the overall structure. FIG. 2B simply illustrates graphene structure 200 on a larger scale.

Figure 3A:
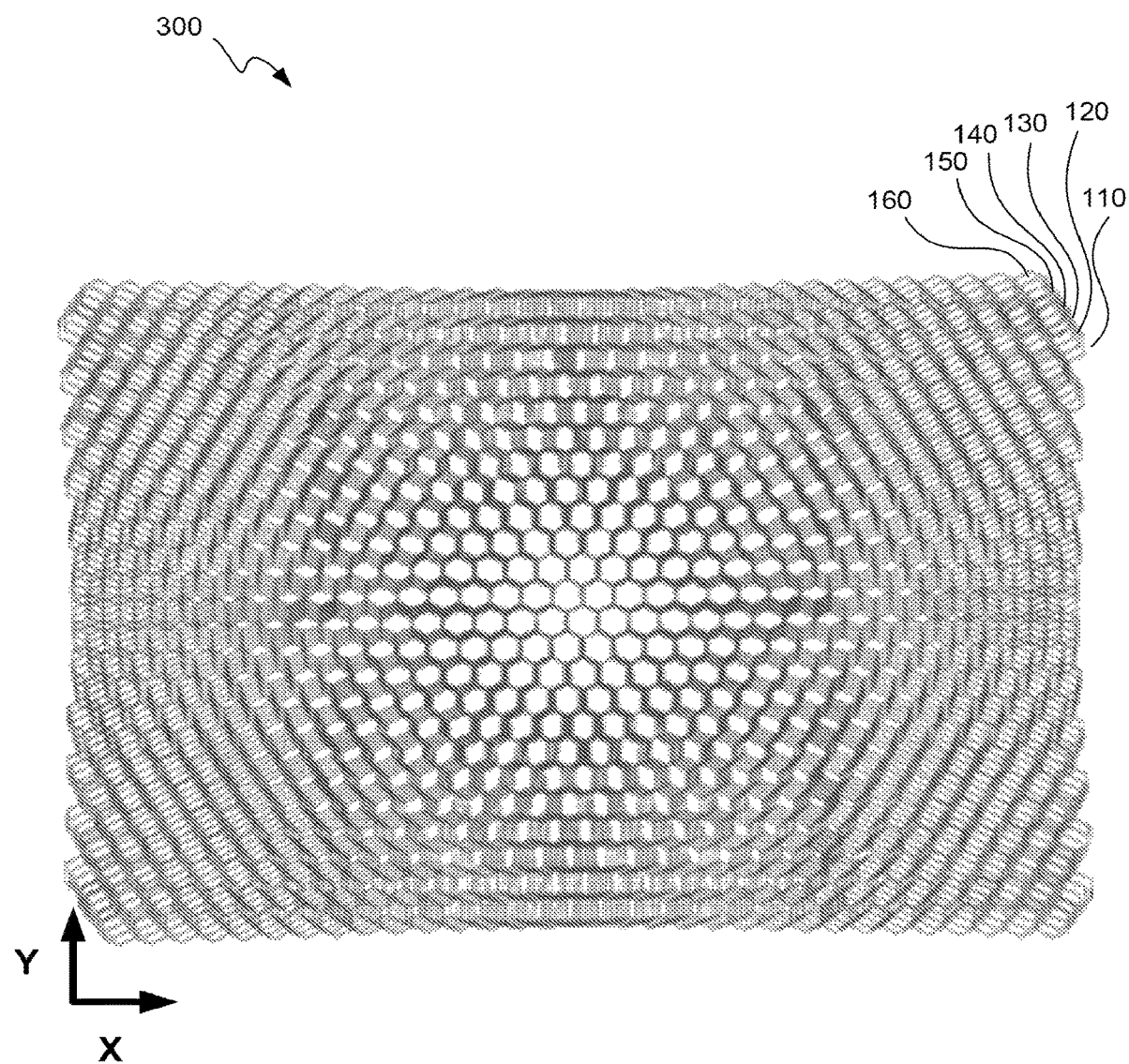
FIG. 3A illustrates in top plan view an example structure having six stacked graphene layers rotated at different angles according to one embodiment of the present disclosure.
Figure 3B:
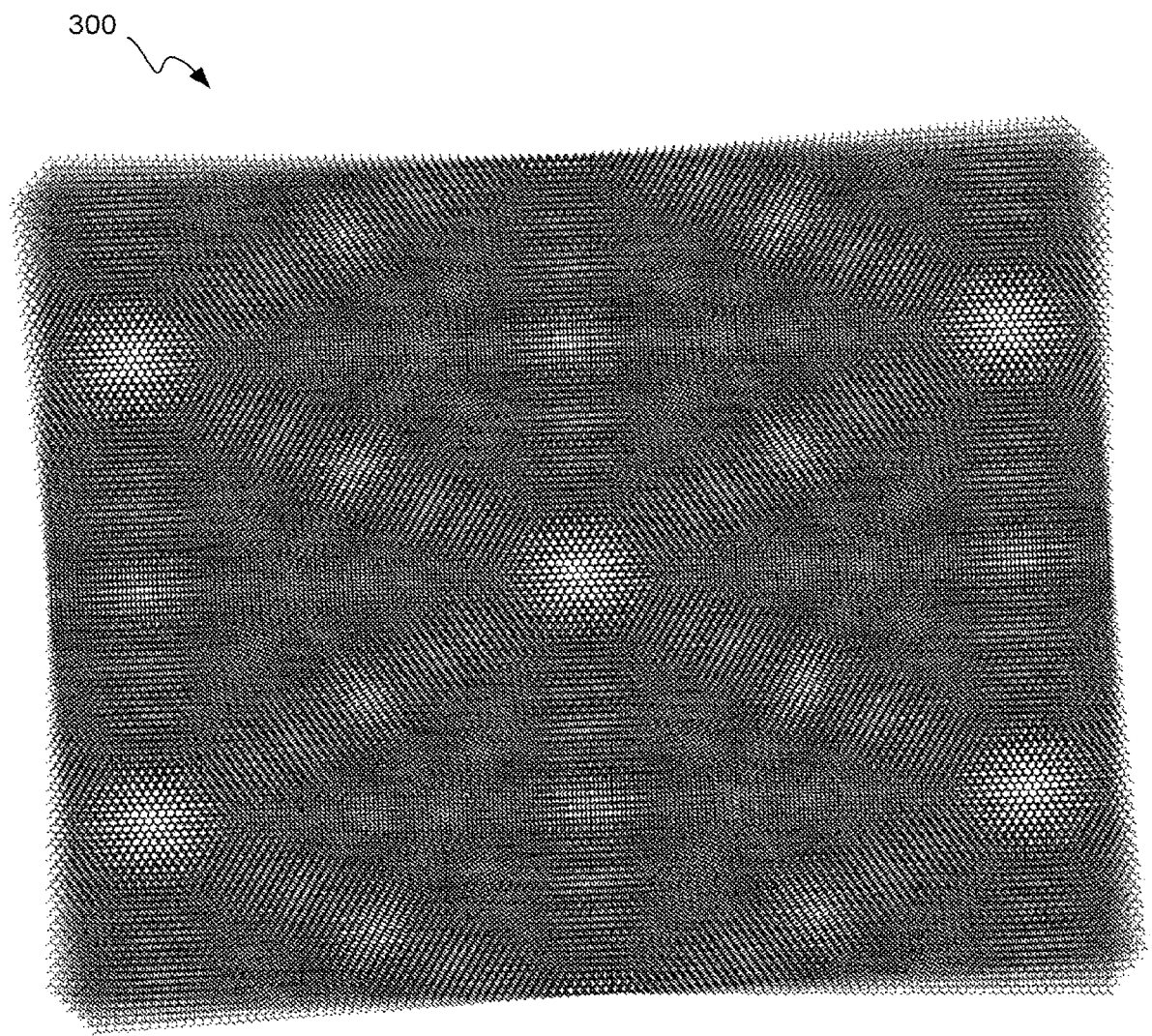
FIG. 3B illustrates in top plan view the structure of FIG. 3A on a larger scale according to one embodiment of the present disclosure.

In various embodiments of the present disclosure, novel and unexplored patterns are used in creating structures having more than two stacked graphene layers. Moving to FIGS. 3A and 3B, an example structure having six stacked graphene layers rotated at relative angles is similarly depicted in top plan view. Graphene structure 300 can include first through sixth graphene layers 100, 110, 120, 130, 140, 150, 160 stacked atop one another. As in graphene structure 200 above, each of these graphene layers can be identical or substantially similar in structure, and each of the layers can extend as far as may be desired in both the X and Y directions. The main difference between these graphene layers 100, 110, 120, 130, 140, 150, 160 can be the relative amount of rotation between each layer with respect to the layer(s) above and/or below it. As shown in FIG. 3, the relative amount of rotation between each of graphene layers 100, 110, 120, 130, 140, 150, 160 can be about one degree. At this rotational arrangement of six stacked graphene layers, more Moire interference patterns can be seen between the overlapping hexagons of all of the layers, and increased desirable effects of the overall structure can be observed.

Although advantages can be observed using six stacked and rotated graphene layers, such as graphene structure 300 shown in FIG. 3A, further advantages can be observed by carefully controlling and altering the amount of relative rotation or twisting between each graphene layer. Patterns beyond the simple linear pattern of graphene structure 300 provide even further increased desirable effects in the overall graphene structure. For example, a progression of increasing amounts of relative rotation (i.e., "angle twisting") from one layer to the next can be better than a simple linear pattern. Rather than have a fully or partially symmetrical relative rotational arrangement, a perturbed symmetry of relative rotation between layers can be used. FIG. 3B simply illustrates graphene structure 300 on a larger scale.

In various embodiments, a pattern of the relative amount of rotation between graphene layers can follow an arithmetic, geometric, or Fibonacci sequence. For example, in the case of a Fibonacci sequence, a first graphene layer can be set at a rotational angle of 0 degrees, a second graphene layer can be set at 1 degree, a third graphene layer can be set at 1 degree, a fourth layer at 2 degrees, a fifth layer at 3 degrees, and a sixth layer at 5 degrees. Additional layers, if used, can then be set at rotational angles, of 8, 13, 21, 34 degrees, and so forth. Alternatively, the first graphene layer can be set at 1 degree, with the rest of the layers set at 1, 2, 3, 5, and 8 degrees. Other starting points in the Fibonacci sequence may also be used. Other types of arithmetic or geometric sequences may also be used.

Furthermore, the initial amount of rotation is not limited to 0 or 1 degrees. Rather, the relative amounts of rotation can follow a ratio pattern that fits the Fibonacci sequence. For example, if the first graphene layer has a first rotational angle of 0 degrees and the second graphene layer has a second rotational angle of 5 degrees, then the first rotational amount between the first and second graphene layers is 5 degrees. The second rotational amount between the second and third graphene layers can then be 5 degrees, and the subsequent rotational amounts between subsequent layers can then be 10, 15, 25, and 40 degrees, and so forth, following a Fibonacci sequence ratio pattern. Other starting amounts for the first rotational angle and/or the first rotational amount in degrees or radians are also possible.

To establish the effects of this layer stacking and perturbed symmetry in relative rotational amounts, transport measurements can be conducted to specifically focus on establishing superconductivity and the relationship between critical temperature and stacking angle configuration. This can be accomplished for certain specific relative rotational amounts between stacked layers, for example, an arithmetic, geometric, or Fibonacci sequence ratio pattern, among other possible sequences or patterns.

Overall, certain specific graphene structures of three or more layers, and particularly six layers, may lead to an increase in superconductivity critical temperature and other improved structural properties when compared to previously noted bilayer graphene structures. Such structures can give a precise degree of tuneable electronic properties that make it valuable for propelling these technologies to a higher readiness level and can provide implications for a range of technologies including transition-edge sensors and bolometer detectors used in space exploration as well as qubits and quantum sensors used in solid-state quantum computers, among other possible technologies.

Figure 4:
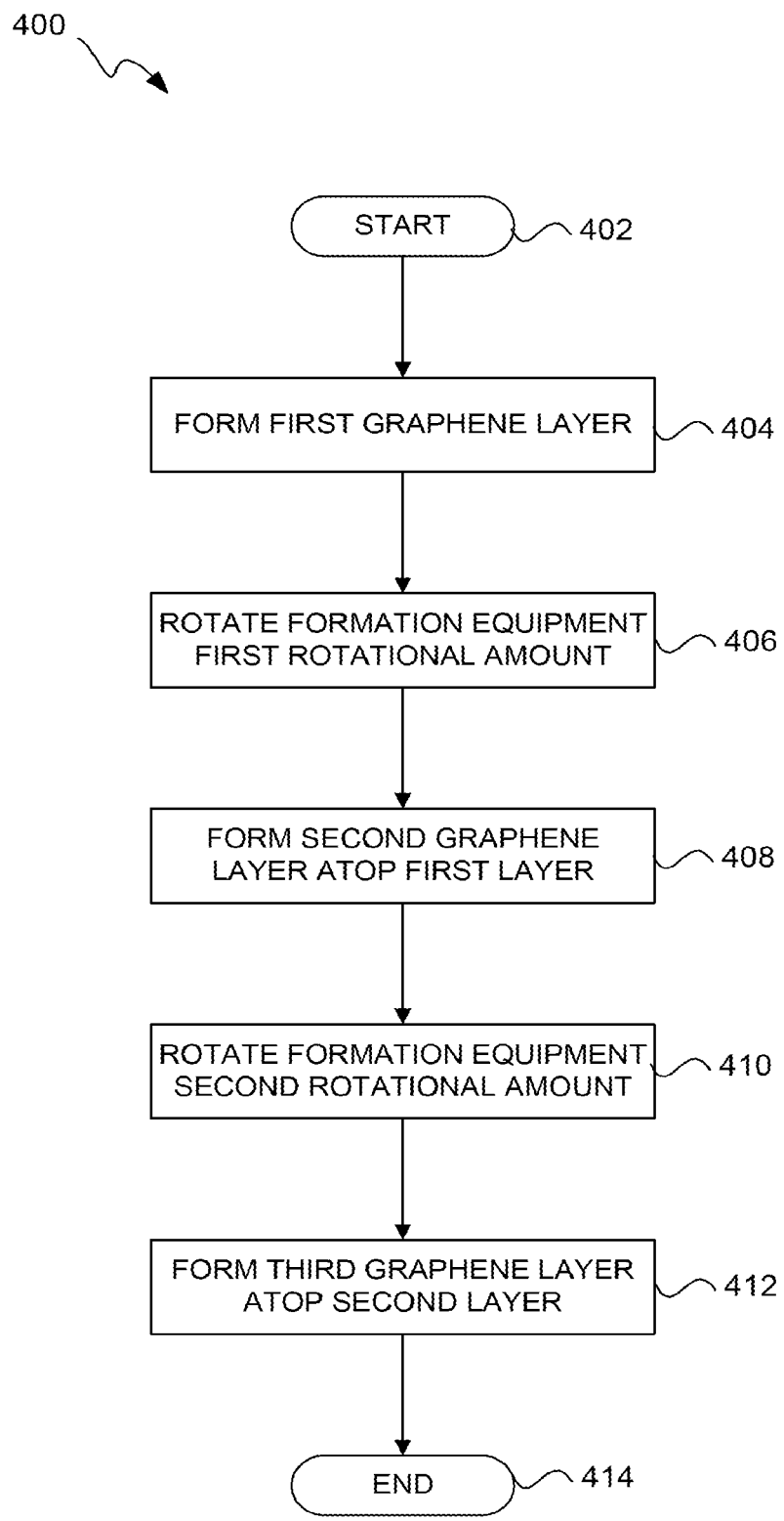
FIG. 4 illustrates a flowchart of an example high-level method of forming a stacked graphene structure according to one embodiment of the present disclosure.

Transitioning now to FIG. 4, a flowchart of an example high-level method 400 of forming a stacked graphene structure is provided. After a start step 402, a first process step 404 can involve forming a first graphene layer. This can be accomplished by any suitable graphene formation process, and the first graphene layer can be situated at a first rotational angle with respect to a rotational axis extending perpendicularly through the first graphene layer.

At a following process step 406, the formation equipment used to form the graphene layers can be rotated a first rotational amount. This can establish a relative amount of rotation between the already formed first graphene layer and the next graphene layer to be formed. At the next process step 408, a second graphene layer can be formed atop the first graphene layer. This can involve the same formation equipment and technique used to form the first graphene layer in process step 404.

At subsequent process step 410, the formation equipment can be rotated a second rotational amount. This can be different than the first rotational amount, such that the relative amounts of rotation between the stacked layers are different. At following process step 412, a third graphene layer can be formed atop the second graphene layer. Again, this can involve the same formation equipment and formation technique. The method then ends at end step 414. Additional graphene layers may be formed if desired, using similar rotate and form steps for each new additional graphene layer.

Stacked graphene structures or devices can be fabricated or formed using commonly established techniques. For example, a cleavage technique can be used where a polymer stamp is used to cleave the graphene, then press the graphene onto a substrate with predefined electrodes. Subsequent layers can then be cleaved and rotated at a specific angle using a microprobe station. Conventional lithography processing can then be used to pattern the electrodes and gate structures that are required for testing and controlling the structure or device.

Resulting structures or devices can be characterized and studied at cryogenic temperatures to ensure that desirable quantum effects are observed. This can involve dilution refrigeration at a temperature below 1 K, for example. A system capable of applying a magnetic field to the device under testing conditions can also be used. Basic device testing can include measuring the resistance as the temperature is reduced to below 1 K, and a superconducting phase can be observed as an abrupt drop in the resistance to zero when the temperature reaches a critical point. By measuring this transition across samples of different twist angle configurations and purported symmetry and perturbed symmetry, the correlation between relative rotational angles and critical temperature can be established.

In various arrangements, a tensile force can be applied to different layers so as to stretch one or more layers to the same or different extents. Alternatively, or in addition, the entire two-dimensional structure can be curved. In some embodiments, one or more layers can be doped with another material, such as hydrogen, for example. Furthermore, each layer can have a different two-dimensional size. For example, the second layer can be 90% of the size of the first layer, and/or other layers can also be of different sizes. These and other features can further improve the properties of the overall structure.

Figure 5:
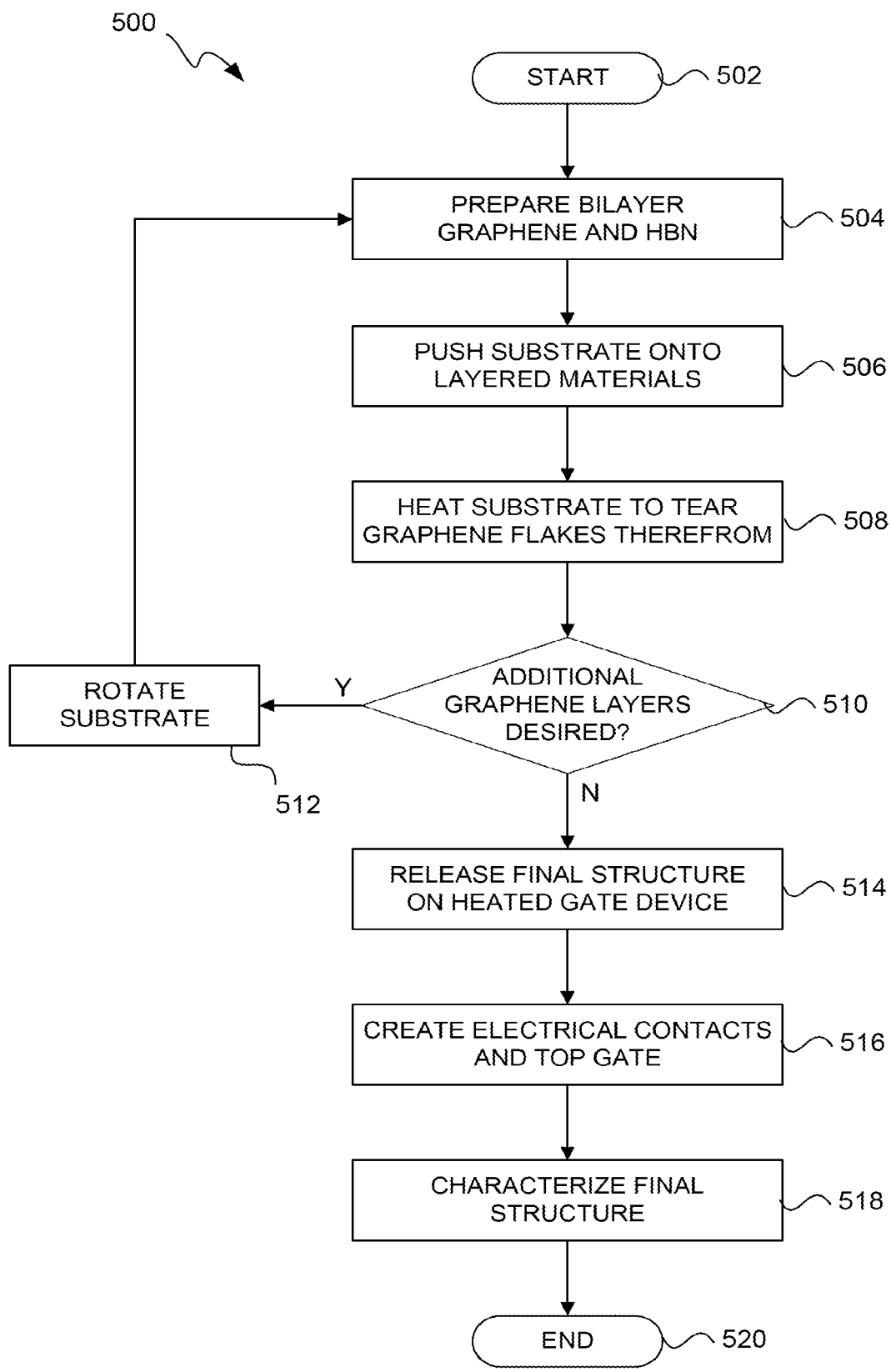
FIG. 5 illustrates a flowchart of an example detailed method of forming a stacked graphene structure having perturbed symmetry according to one embodiment of the present disclosure.

FIG. 5 illustrates a flowchart of an example detailed method 500 of forming a stacked graphene structure having perturbed symmetry. After a start step 502, a first process step 504 can involve preparing a bilayer graphene and hexagonal boron nitride ("hBN") arrangement. This precursor structure can be prepared using a "scotch tape method," which can involve placing adhesive tape over electronic grade graphite or hBN and peeling layers off of the surface. The peeled off layers can then be rubbed onto a substrate such as silicon dioxide and silicon, and the process is repeated until micrometer flakes of a few layers of graphene are obtained. The thickness and quality of the flakes can then be verified, such as by using optical microscopy and atomic force microscopy.

At the next process step 506, a substrate can be pushed onto the layered materials. The substrate can be glass coated with a polymer such as polydimethylsiloxane ("PDMS"). At subsequent process step 508, the substrate can be heated to tear graphene flakes therefrom. Heating can be to about 100 degrees Celsius, for example. A transparent glass and PDMS layer can allow visibility of hBN flakes attached thereto. A van der Waals interaction between the hBN and the graphene can then allow the graphene flake to be torn from the silicon dioxide and silicon substrate, which then provides the layer of graphene.

At decision step 510, an inquiry can be made as to whether additional graphene layers are desired for the stacked graphene structure. If so, then the method proceeds to process step 512 where the substrate can then be rotated. Rotation can be to a desired degree or amount, which may follow an arithmetic, geometric, or Fibonacci pattern, or some other relative pattern with respect to previous degrees or amounts of rotation for any previous layers, as set forth above. The process then reverts to process step 504, and steps 504-510 are repeated. This series of steps can be repeated until the desired number of graphene layers are constructed. Again, the amount of rotation at step 512 can vary at each iteration.

If no further graphene layers are desired at decision step 510, however, then the method instead proceeds to process step 514, where the final stacked structure can be released on a heated gate device. This can involve a predefined palladium and gold backed gate device structure that can be pre-heated to about 170 degrees Celsius, for example.

At the next process step 516, electrical contacts and a top gate can be created on the final structure. This can involve the use of electron beam lithography and reactive ion etching. The electrical contacts and top gate can be deposited by thermal evaporation of chromium and gold, for example, creating edge contacts to the encapsulated graphene.

At following step 518, the final structure can be characterized. This can be performed using transport measurement systems in a dilution refrigerator with a superconducting magnet, for example. In various arrangements, this process can involve low-frequency lock-in techniques for data acquisition with lock-in amplifiers. Resistance measurements can involve the use of a voltage excitation less than 100 μV or a current excitation of less than 10 nA, for example. The method then ends at end step 520.

For the foregoing methods 400 and 500, it will be appreciated that not all process steps are necessary, and that other process steps may be added in some arrangements. Furthermore, the order of steps may be altered in some cases, and some steps may be performed simultaneously. For example, step 514 may be performed sooner in the process in some arrangements. Although known process steps are provided for the various formation techniques in method 500, it will be appreciated that any other suitable method for forming and stacking graphene layers can also be used. Other variations and extrapolations of the disclosed methods will also be readily appreciated by those of skill in the art.

As noted above, the foregoing structures and formation techniques using perturbed symmetry between stacked two-dimensional layers are not limited to graphene. The same types of structures and techniques disclosed herein can be applied to alternative two-dimensional materials, such as, for example, transition metal dichalcogenides. Such materials demonstrate a wide variety of phenomena that are suitable for next-generation technologies, such as optical emitters, detectors, valleytronics, spintronics devices, and the like. These materials can be composed of large atoms such as tungsten bonded to a chalcogenide (e.g., sulfur, tellurium, selenium, etc.), and the resulting two-dimensional layers can also be stacked and twisted to form Moire interference patterns like the stacked graphene structures disclosed herein. Again, other materials, rotational patterns, and extrapolations are also possible.

Figure 6:
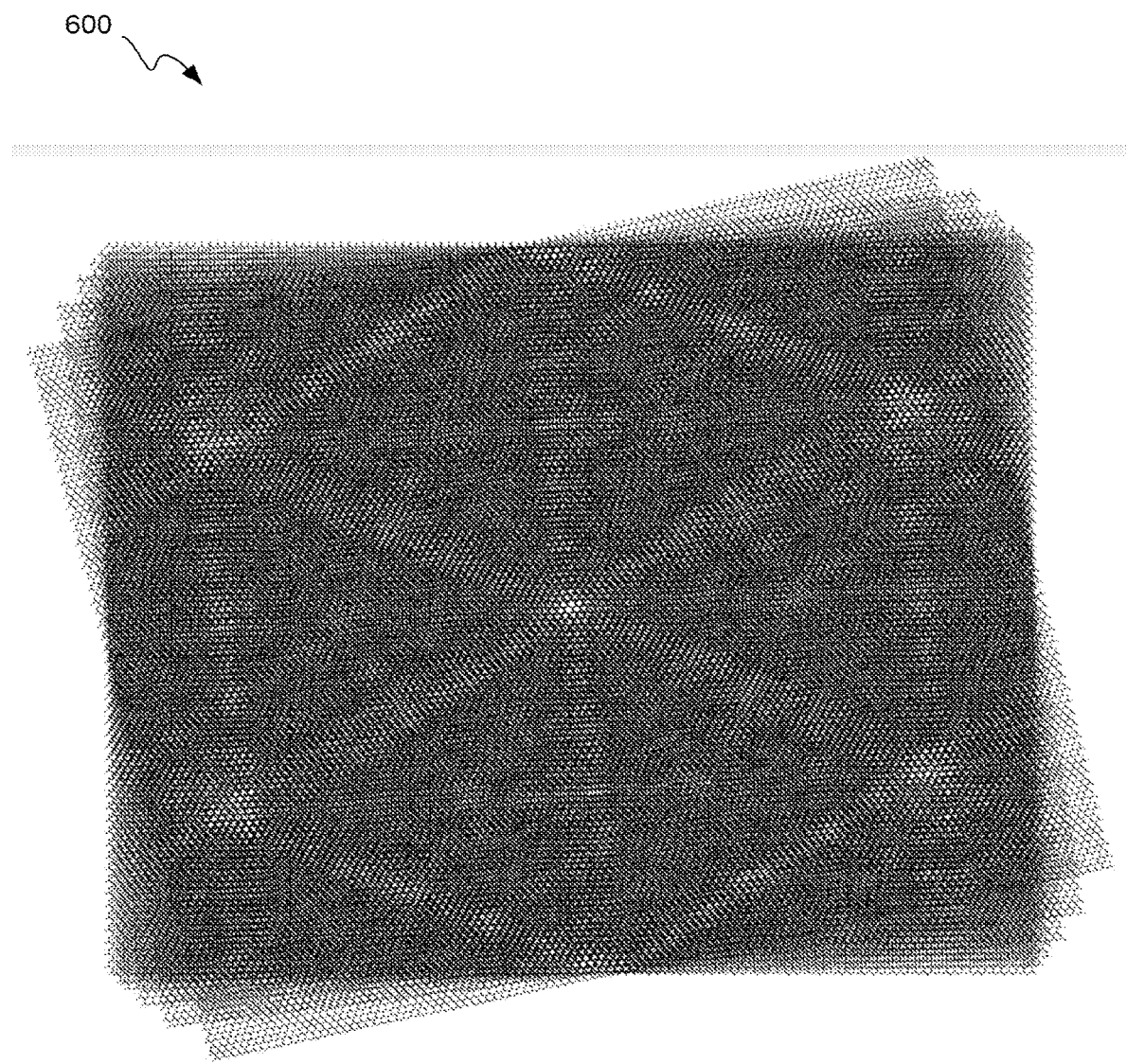
FIG. 6 illustrates in top plan view an example structure having six stacked graphene layers rotated at angles in a Fibonacci sequence according to one embodiment of the present disclosure.

Finally, FIG. 6 illustrates in top plan view an example structure having six stacked graphene layers rotated at angles in a Fibonacci sequence. Graphene structure 600 is similar to the foregoing graphene structure 300, except that the relative angles of rotation from one layer to the next follow a Fibonacci sequence.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An apparatus, comprising:
   a first graphene layer situated at a first rotational angle with respect to a rotational axis extending perpendicularly through the first graphene layer;
   a second graphene layer situated directly atop the first graphene layer at a second rotational angle with respect to the rotational axis;
   a third graphene layer situated directly atop the second graphene layer at a third rotational angle with respect to the rotational axis, wherein the third rotational angle is greater than the second rotational angle; and
   one or more additional graphene layers, each additional graphene layer being situated directly atop the previous graphene layer at an additional rotational angle with respect to the rotational axis, wherein each additional rotational angle is greater than the previous rotational angle, and wherein the relationship of the ratios of all rotational angles forms a Fibonacci sequence.

2. The apparatus of claim 1, wherein the apparatus exhibits superconductivity properties at temperatures greater than related critical temperatures for other bilayer graphene structures.

3. The apparatus of claim 1, wherein the apparatus exhibits increased thermal conductivity, tensile strength, and/or photosensitivity at temperatures greater than related critical temperatures for other bilayer graphene structures.

4. A graphene structure, comprising:
   a first graphene layer situated at a first rotational angle with respect to a rotational axis extending perpendicularly through the first graphene layer;
   a second graphene layer situated directly atop the first graphene layer at a second rotational angle with respect to the rotational axis;
   a third graphene layer situated directly atop the second graphene layer at a third rotational angle with respect to the rotational axis, wherein the third rotational angle is greater than the second rotational angle;
   a fourth graphene layer situated directly atop the third graphene layer at a fourth rotational angle with respect to the rotational axis, wherein the fourth rotational angle is greater than the third rotational angle;
   a fifth graphene layer situated directly atop the fourth graphene layer at a fifth rotational angle with respect to the rotational axis, wherein the fifth rotational angle is greater than the fourth rotational angle; and
   a sixth graphene layer situated directly atop the fifth graphene layer at a sixth rotational angle with respect to the rotational axis, wherein the sixth rotational angle is greater than the fifth rotational angle, wherein the relationship of the ratios from the first rotational angle through the sixth rotational angle forms a Fibonacci sequence, and wherein the graphene structure exhibits superconductivity properties at temperatures greater than related critical temperatures for other multiple layer graphene structures.

* * * * *